United States Patent [19]

Arai

[11] Patent Number: 4,855,983
[45] Date of Patent: Aug. 8, 1989

[54] APPARATUS FOR RECORDING AND READING AN OPTICAL DISK, HAVING REDUCED OFFSET IN ITS TRACKING ERROR SIGNAL

[75] Inventor: Shigeru Arai, Zushi, Japan

[73] Assignee: Fujitsu Limited, Kawasaki, Japan

[21] Appl. No.: 128,279

[22] Filed: Dec. 3, 1987

[30] Foreign Application Priority Data

Dec. 3, 1986 [JP] Japan ............................. 61-289549

[51] Int. Cl.$^4$ ............................................. G11B 7/00
[52] U.S. Cl. ........................................ 369/46; 369/44
[58] Field of Search ................... 358/342; 369/43–47, 369/109, 124; 250/201; 360/77.01, 77.04, 77.05

[56] References Cited

U.S. PATENT DOCUMENTS

| | | | |
|---|---|---|---|
| 4,663,751 | 5/1987 | Kaku et al. ............................. | 369/46 |
| 4,730,294 | 3/1988 | Funada ................................. | 369/46 |
| 4,748,609 | 5/1988 | Yonezawa et al. .................... | 369/44 |

Primary Examiner—Robert L. Richardson
Attorney, Agent, or Firm—Staas & Halsey

[57] ABSTRACT

A push-pull type tracking error signal produced by reflected light from pits on an ID area of an optical disk is averaged and sampled during a period while a light spot is scanned over the ID areas. An averaged value of a signal representative of the reflected light is stored for each sector of the disk, this value being a first sampled tracking error signal. The tracking error signal is also sampled while the light spot is scanned over a vacant zone having no pits in a data area, storing a second sampled tracking error signal. This vacant zone to be sampled is located either before or after a sequence of data bits in each sector. The first sampled tracking error signal is smaller than the second sampled tracking error signal because of the AC component produced by the pits. Thus, when an offset of the tracking exists, though the tracking error signal is kept almost zero by the servo control, the first sampled tracking error signal is not zero. Therefore, differences between the two tracking error signals indicates the amount of the offset. This offset signal may be visually monitored for adjusting the offset of the apparatus, or may be fed back for the tracking servo. The invention can be applied to a disk format having no mirror mark. The circuit of the invention is simple and inexpensive, because no high frequency need be output.

9 Claims, 6 Drawing Sheets

FIG. 9 b THE AVERAGE

DIFFERENCE OF OUTPUTS OF PHOTO ELEMENTS, A,B AT PREFORMAT PITS a

FIG. 10a $SP_1$, 12, 11

FIG. 10b
TRACKING ERROR SIGNAL $S_{te}$ a b

FIG. 10c
SECTOR MARK

FIG. 10d
SAMPLING PULSE $S_{s1}$

FIG. 10e
SAMPLING PULSE $S_{s2}$

FIG. 10f
SECOND SAMPLED TRACKING ERROR SIGNAL — 0

FIG. 10g
FIRST SAMPLED TRACKING ERROR SIGNAL — 0

FIG. 10h
$\Delta v = b-a$  $S_{to}'$  0

FIG. 10i
OFFSET INDICATION $S_{to}$

APPARATUS FOR RECORDING AND READING AN OPTICAL DISK, HAVING REDUCED OFFSET IN ITS TRACKING ERROR SIGNAL

BACKGROUND OF THE INVENTION

1. Field of the Invention

This invention relates to an apparatus for reading and/or recording digital information on an optical disk and, more particularly, to an improvement for reducing residual offset in tracking error signals detected by a pair of light detectors situated symmetrically with respect to the center of a spiral or coaxial track on the optical disk.

2. Description of the Related Art

Figure 1A:
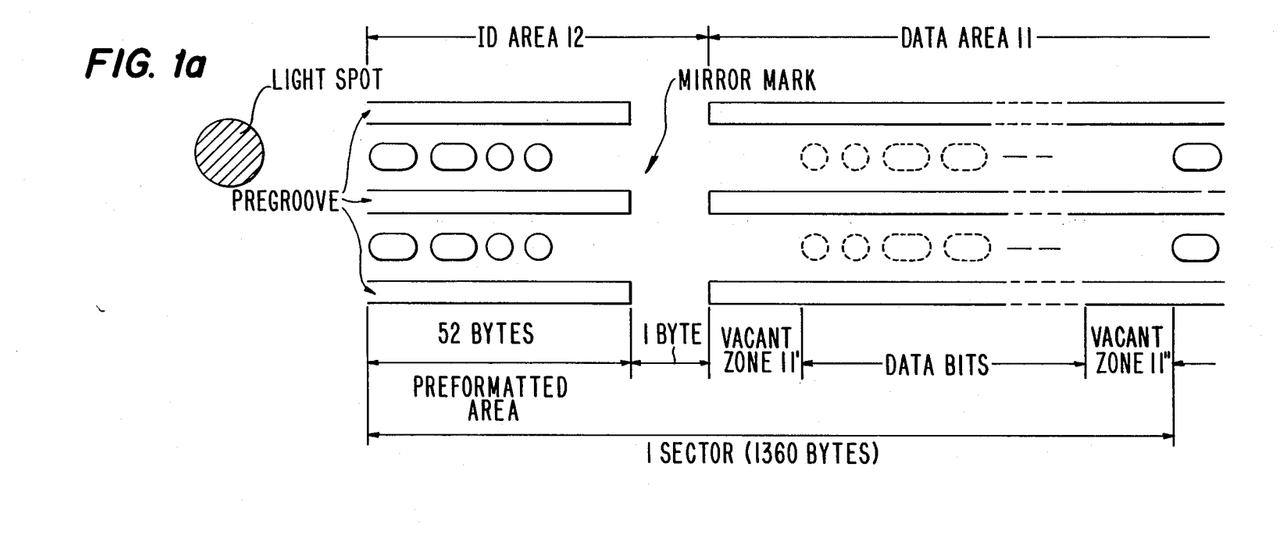
FIGS. 1a and 1b show typical formats of a sector of an optical recording disk.
Figure 1B:
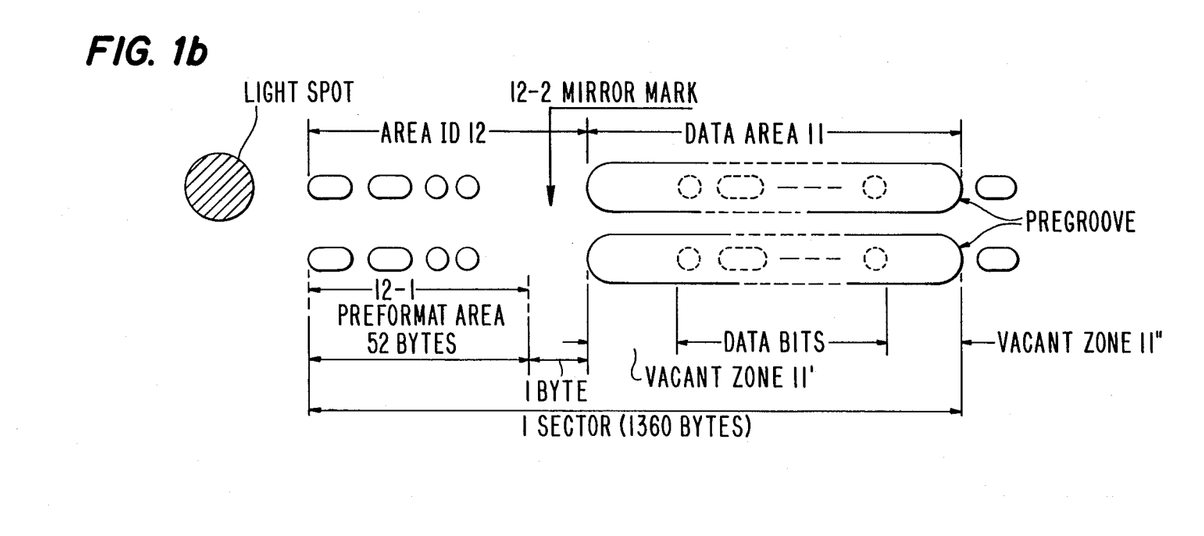

An optical disk on which spiral or coaxial tracks are arranged to record bits of digital information has been developed as an external memory media for digital computers. There are many different formats for the tracks, but a single track (one circulation of the disk) typically includes seventeen sectors. Typical sector formats which are now under discussion for industry standards are shown in FIGS. 1a and 1b. In the format of FIG. 1a, a groove, called a pre-groove, is provided between adjacent tracks. Data bits are recorded on the area between the pre-grooves, and recording in this format is called "on-land recording". In contrast, FIG. 1b shows a format used for "in-groove" recording. In the format of FIG. 1b, a pre-groove is provided on a portion where the bits are to be written. Recording using this format is called "in-groove recording".

In either of the above formats, each sector typically stores 1360 bytes. Each sector is broken into a data area 11, storing 1307 bytes, and an ID (identification of the sector) area 12 storing 53 bytes. The ID area 12 is made up of a preformat area 12-1, and a mirror mark 12-2 which stores no data and has no groove, but takes up one byte space. The data bits of the pre-format area 12-1 are installed in pits formed along with the grooves on the disk when the disk is manufactured. Further explanation of the mirror-mark 12-2 follows below.

The data area 11 is free of data until the data bits are written thereon during recording. The "dashed" circles in FIGS. 1a and 1b indicate a "potential" sequence of data bits to be written on the data area 11. Vacant zones 11' and 11" are provided at either end of a sequence of data bits recorded in the data area 11. The vacant zones are always free of data and cause gaps as long as 20 microseconds (referred to hereinafter as μs).

Figure 2:
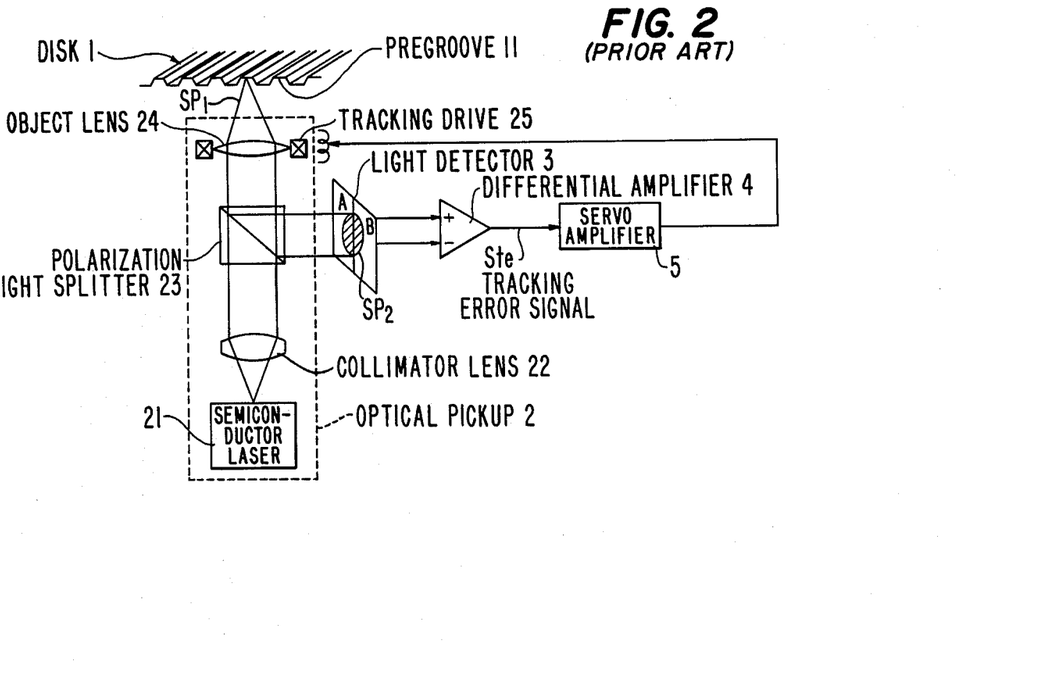
FIG. 2 shows a prior art tracking servo mechanism for an optical disk apparatus.

The radial pitch of the tracks of these disks is small, typically 1.6 micrometers (referred to hereinafter as μm) and the rotation of the disk may be eccentric (varying as much as several hundred μm). For a light spot SP1 from a laser to consistently trace the center of the track, a servo mechanism is provided. A typical configuration of a prior art optical pick up and its servo mechanism is schematically shown in FIG. 2. A light produced by a semiconductor laser 21 is focussed by a collimator lens 22 and an object lens 24 to produce a light spot or light beam SP1 on the track center. Light reflected from the spot SP1 is further reflected by a polarization light splitter 23 to focus a spot SP2 onto a light detector 3, which includes two symmetrical photo detector elements A and B. The light detector 3 is situated so that the center line of the track is focussed to coincide with the border of the two elements A and B. Elements A and B sense the amount of light reflected from the disk. If the light beam is focussed on the track center line, elements A and B will receive equal amounts of reflected light and output a value indicative of this. If the elements A and B sense different amounts of reflected light, this indicates that the light beam is not focussed on the center of the track. A difference between the output levels of the two elements A and B is detected by a differential amplifier 4. The tracking error output Ste of the differential amplifier 4 indicates the amount and direction of the tracking error, which is a deviation of the light spot SP1 from the track center.

Figure 3A:
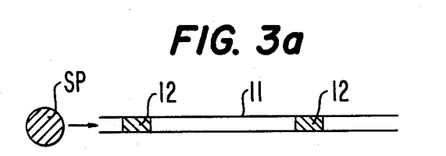
FIGS. 3a-3c show tracking error signals when the light spot is at the center of the track without an offset.
Figure 3B:
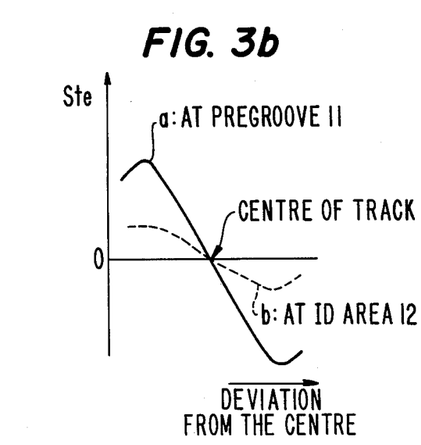
Figure 3C:
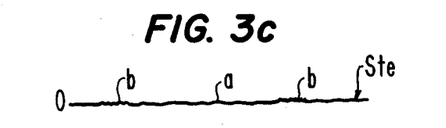

Characteristics of the tracking error signals are explained below with reference to FIGS. 1b, 2 and 3. A tracking error signal is fed back to a servo mechanism to adjust object lens 24 (FIG. 2) to center the light spot on the track. However, if, for example, the disk is skewed, the light spot will still be "offset" from the track center. FIG. 3 shows the value of the tracking error signal versus deviation of the light spot SP1 from the center of the track, for a disk having no offset. The solid line (a) indicates the tracking error signal Ste at the pre-groove area 11 having no data-bits thereon. The dashed line (b) indicates the tracking error signal at the pre-format area 12-1 having pre-format bits thereon. Because there is no offset, the zero points of the two tracking error signals coincide with each other and with the center of the track. The tracking error signal Ste is negatively fed back through a servo amplifier 5 (FIG. 2) to a tracking drive 25 of the tracking servo mechanism to adjust location of the object lens 24 or the entire optical pick-up 2, so that the tracking error signal approaches zero. This is the widely used push-pull method. However, even when the spot traces the track center, if the disk is skewed, or the axis of the lens is not aligned on the center border line of the light detector 3, or other adjustments are poor, a tracking error signal may still occur. This tracking error signal is like a bias component in the signal and is called the offset. The offset is further explained with reference to FIG. 4, in which "D" indicates the offset in radial distance on the track, and Sos indicates the offset in the tracking error signal Ste. The offset is represented by the amount Sos of the tracking error signal Ste when the spot is correctly located at the center of the track. In other words the deviation "D" of the light spot SP1 from the center of the track, when the spot is servo controlled to keep the tracking error signal essentially zero, is the offset. The zero point of the tracking error signal including the offset component does not coincide with the center of the track. Therefore, a tracking servo system controlled by only the above-mentioned tracking error signal still deviates from the center of the track.

Prior art techniques to compensate for this offset and its problems are hereinafter described. One such prior art technique is disclosed by T. Kaku et al. in the U.S. Pat. No. 4,663,751 and unexamined Japanese Patent No. Sho 61-280036. In the Kaku et al. publications, the reflected light from a mirror mark produces a tracking error signal which indicates the degree of the offset, because the light spot at a pregroove area is servo controlled so that the tracking error signal approaches zero. Thus, the tracking error signal at the mirror mark is utilized for compensating the offset. However, the circuits referred to in Kaku et al. must sample a mirror mark as short as 1.5 μs and handle very high frequencies of more than 5 MHz produced by the pre-format bits. Accordingly, circuits to allow this sampling, such as differential amplifiers, adder circuits and sample-hold circuits, cause considerable increases in production costs and occupy substantial space. Further, this method cannot be applied to a disk format that does not have a mirror mark.

Another prior art technique is disclosed by K. Tatsumi et al. in unexamined Japanese Patent Nos. Sho 61-8745 and Sho No. 61-13447. In these two publications, the reflected light from a flat portion between each pre-format bit is sampled and utilized as a signal which indicates a degree of offset. Circuits for sampling the portions between 5 MHz bits require higher frequency characteristics than those of the abovementioned Kaku's et al. circuits. Thus, the circuits must be very sophisticated, expensive and bulky.

Another prior art technique is disclosed by Y. Tsunoda et al. in "On-land Composite Pre-groove Method for High Track Density Recordings" presented during the Proceedings of SPIE-The International Society for Optical Engineering held on Aug. 18-22, 1986 in San Diego, Calif., at a session entitled "Optical Mass Data Storage II". In this report, Tsunoda et al. proposed utilization of wobbled pit marks in the place of the above-mentioned mirror mark. Circuits used in Tsunoda's proposal also require high frequency characteristics of several MHz. Again, the circuits must be very sophisticated, expensive and bulky.

SUMMARY OF THE INVENTION

It is an object of the present invention to provide a servo controlling circuit which helps compensate for an offset in a tracking error signal simply and inexpensively.

Another object of the present invention is to provide a servo controlling circuit for which strict tolerance requirements on assembling the apparatus as well as strictly controlled environmental conditions can be relaxed.

Another object of the present invention is to provide a servo controlling circuit in which the servo gain of the tracking servo mechanism can be increased, without requiring a sophisticated, bulky and expensive circuit.

Still another object of the present invention is to provide a servo controlling system which can be used with an optical disk having no mirror mark, allowing more room for storing data and resulting in a higher capacity disk.

The present invention achieves the above-mentioned objects by a first detection sample-hold circuit outputting a first signal. This first signal represents an average tracking error of a first reflected signal reflected from a first portion of a sector containing data. The first signal is subtracted from a second signal (a reference signal) representative of a second reflected signal reflected from a second portion of a sector containing no data. The resulting signal represents an amount of offset of the track of the disk due to, for example, a skewed disk. This "offset" signal is then used to correct a tracking error signal.

The present invention has a first detection circuit which outputs a difference between two outputs of photodetector elements. The detected difference is averaged for a first predetermined period during which a light spot scans preformat bits and is output as a first sampled tracking error signal. A second sampled tracking error signal is derived by scanning a second area containing no data. The first sampled tracking error signal is smaller than the second sampled tracking error signal because the signal level of the reflected light is lowered by the existing bits scanned during the first period. If there is no offset, the first and second sampled tracking error signals are both close to zero, because the spot is servo controlled so that the second sampled tracking error signal approaches zero. When there is an offset, although the spot is servo controlled to keep the second sampled tracking error signal essentially zero, the first sampled tracking error signal still remains. Thus, the difference between the first and second sampled tracking error signals indicates the amount of the offset. This offset signal may be utilized as a monitor to adjust alignment of the apparatus, such as an optical system or the light detector, etc., and also may be fed back with the tracking error signal, automatically compensating for the offset component.

The first detection circuit does not output high frequency components produced by the pre-format bits, but only the average level of the frequency components produced by the pre-format bits. Therefore, the circuit can be simple and inexpensive. This invention is compatible with disk formats with or without mirror marks.

The above-mentioned features and advantages of the present invention, together with other objects and advantages which will become apparent, are more fully described hereinafter, reference being had to the accompanying drawings forming a part hereof, wherein like numerals refer to like parts throughout.

DESCRIPTION OF THE PREFERRED EMBODIMENTS

Figure 6:
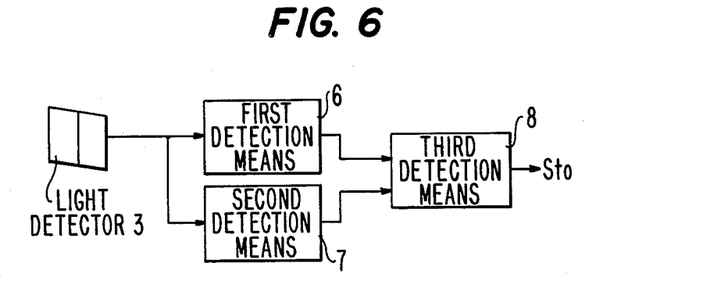
FIG. 6 is a block diagram of the present invention.

In the present invention, as illustrated in FIG. 6, a light detector 3 has photodetector elements A and B, and the track center line of the reflected light spot is adjusted to fall onto the border line of photodetector elements A and B. First detection means 6 detects a difference between the outputs of the two photoelements and outputs the detected difference sampled and averaged during a first scanning period while the light spot scans the pre-format area 12-1 and produces a first sampled tracking error signal. Second detection means 7 detects a difference between the light detector's output signals sampled during a second scanning period while the light spot scans the data area before (11') or after (11″) the end of a sequence of the data bits of the previous sectors and produces a second sampled tracking error signal. Third detection means 8 detects a difference between the first and second sampled tracking error signals.

Figure 8:
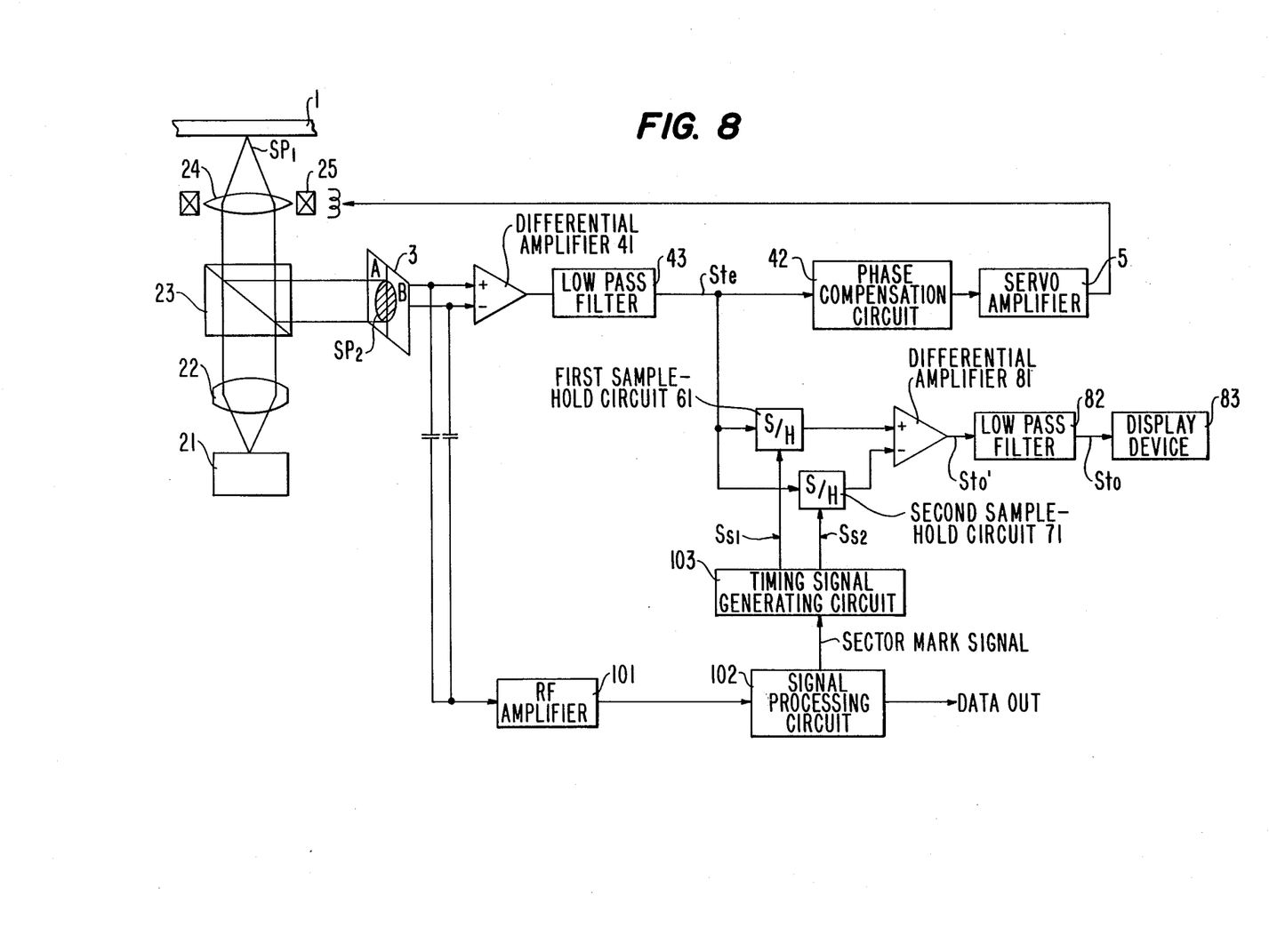
FIG. 8 is a circuit diagram of an application of the present invention.
Figure 9:
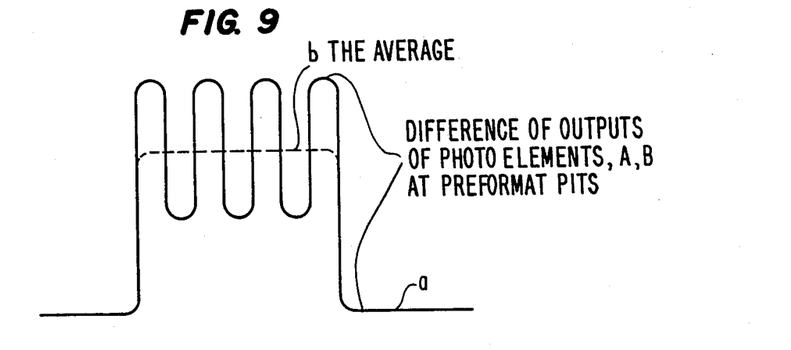
FIG. 9 is a graph of a waveform produced when the tracking error signal is detected.
Figure 10A:
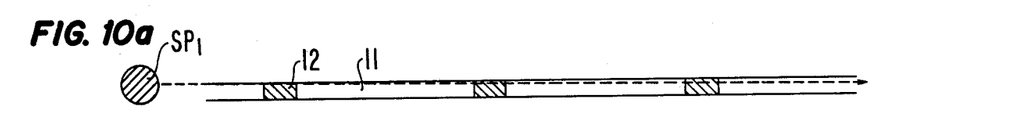
FIGS. 10a-10i are timing charts of the circuit embodying the present invention.
Figure 10B:
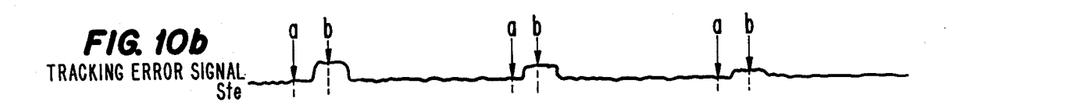

FIG. 8 shows an application of the circuit of FIG. 6 in a circuit for monitoring the amount of the offset. The graph of FIG. 9 and the timing charts of FIG. 10 are derived from the circuit of FIG. 8. A differential amplifier 41, a low pass filter 43 and a first sample-hold circuit 61 comprise the first detection means 6. Differential amplifier 41, the low pass filter 43 and a second sample-hold circuit 71 comprise the second detection means 7. The signals output from photoelement A and B of the light detector 3 are input to the differential amplifier 41. Amplifier 41 outputs a difference between the input signals. When the light spot scans over an area having data bits, such as the pre-format bits in the pre format area 12-1, the signal of the reflected light includes an approximately 5 MHz component produced by the bits as shown by a solid line in FIG. 9. However the present invention utilizes the average of the reflected light signal, which is shown by a dashed line in FIG. 9, as well as a slowly changing signal at the pre-groove area, which does not contain a high frequency component. A low pass filter 43 having a cut off frequency of 100 kHz, for example, is provided at the output terminal of the differential amplifier 41, and outputs a tracking error signal Ste as shown in FIG. 10b. The tracking error signal Ste is negatively fed back to a tracking drive 25 through a phase compensation circuit 42 and a servo amplifier 5 by a well known servo technique. Each of the sample hold circuits 61 and 71 samples the tracking error signal Ste from the differential amplifier 41 through the low pass filter 43 only during the period specified by the timing generator circuit 103, and then outputs the input signal level which is stored until a next sampling is requested. An output from the first sample-hold circuit 61, called a first sampled tracking error signal (FIG. 10f), and an output from the second sample-hold circuit 71, called a second sampled tracking error signal (FIG. 10g), are input to a differential amplifier 81. The output of amplifier 81 is delivered to a display device 83 via a low pass filter 82. The differential amplifier 81 and the low pass filter 82 comprise third detection means 8.

The operation of the circuit is described below. As explained above, when the light spot SP1 traces without any offset along the center of the track (as shown in FIG. 3a by an arrow mark), the output tracking error signal varies depending on what is being scanned. Where the pre-groove 11 is free of data-bits (no data has been written yet), the tracking error signal output from the pre-groove area 11 is shown by a solid line "a" in FIG. 3b. The tracking error signal output from the pre-format area 12-1 is shown by dashed line "b" in FIG. 3b, where the abscissa shows deviation of the spot from the center of the track. The level of the tracking error signal Ste from an area having bits (for example, the pre-format area) is smaller than that of the tracking error signal from the pre-groove area (which has no bits), because the reflected light is reduced by the AC component produced by the existence of the bits. If there are data bits already written in the pre-groove area 11, the level of the tracking error signal therefrom al-o becomes smaller (like the signal received when scanning the pre-format bits), depending on the bits written thereon. However, the light spot can still be servo controlled by either signal from the pre-groove area (with or without the data bits), by the phase compensation circuit 42, the servo amplifier 5, and the tracking drive 25 to keep the light spot along the center of the track along the pre-groove 11. Therefore, as seen in FIG. 3c, the levels of these tracking error signals, "a" from the pre-groove area and "b" from the pre-format area are almost zero throughout a sector. The phase compensation circuit 42, as widely used, has a peak frequency characteristics of, for example, 3 kHz, resulting in a stable feedback loop (that prevents self oscillation in the loop).

Figure 4A:
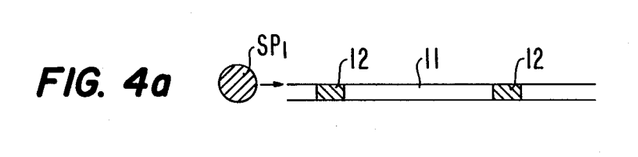
FIGS. 4a-4d show tracking error signals when an offset exists.
Figure 4B:
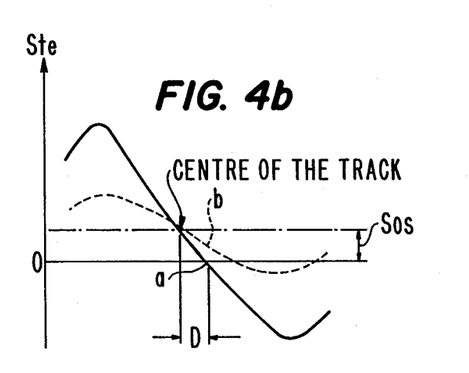
Figures 4C, 4D:
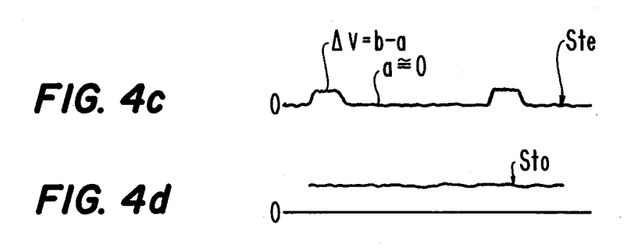
Figure 5A:
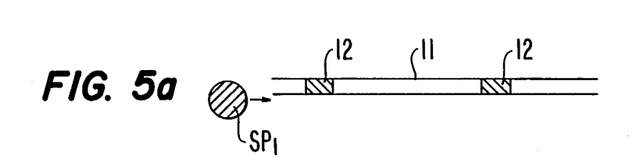
FIGS. 5a-5d show tracking error signals when an offset exists on another side of the track.
Figure 5B:
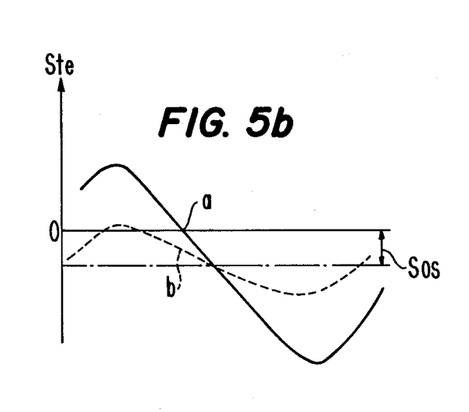
Figure 5C:
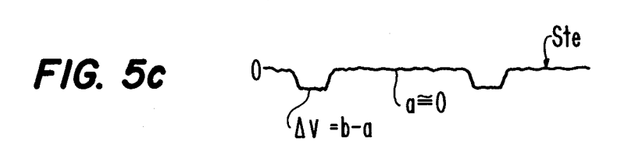
Figure 5D:
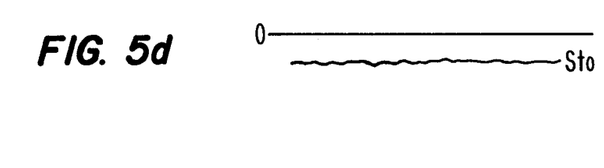
Figure 10C:
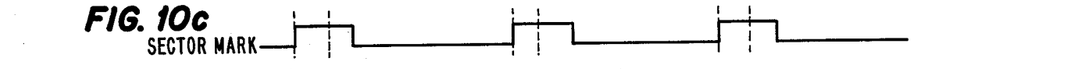
Figure 10D:
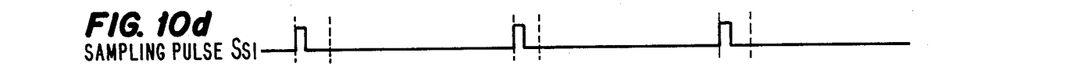
Figure 10E:
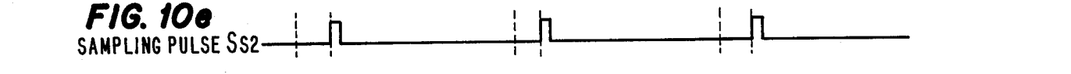
Figure 10F:
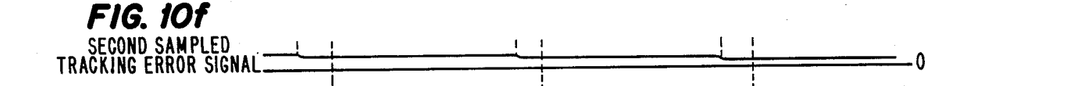
Figure 10G:
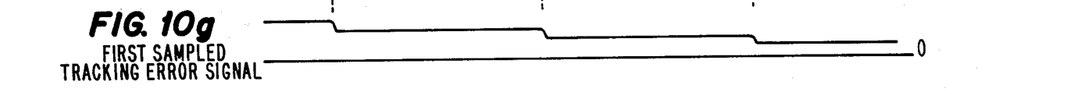
Figure 10H:
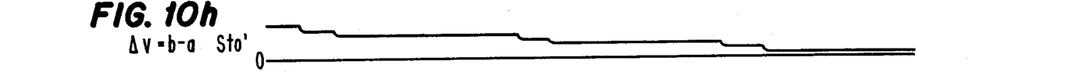
Figure 10I:
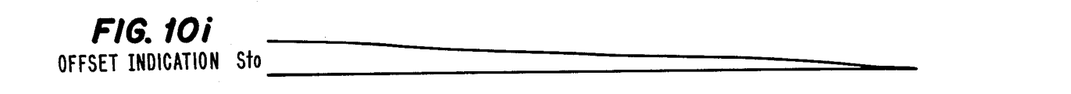

When the apparatus encounters an offset situation, the light spot is deviated, for example, to the upper side of the center of the track, as shown by SP1 in FIG. 4a. The light spot SP1 is servo controlled by the tracking error signal "a" while the light spot traces along the pre-groove 11. Thus, the level of the tracking error signal "a" is kept almost at zero (as seen in FIG. 4b and FIG. 4c) by the same servo mechanism as those used to develop the signals of FIGS. 3a–3c. When the light spot scans over the pre-format bits 12-1, the tracking error signal Ste becomes level "b", departing from zero as shown in FIG. 4b and FIG. 10b. This is because the light spot, which is electro-mechanically driven, cannot follow the sudden and short change of the tracking error signal Ste, where "b" is about 50 to 60 $\mu$s. In other words, the light spot traces an extended line of the light spot trace along the pre-groove 11 because of the inertia of the electro-mechanical optical device, even though the pre-format bits in area 12-1 produce their own tracking error signal "b", which should servo-drive the spot along the pre-groove 11. The amplitude of "b" is smaller than that of "a", but is proportional to the level of the tracking error signal which should appear if it has no bits thereon. Therefore, the difference $\Delta V$ between the tracking error signal "b" at the pre-format bits in area 12-1 and the tracking error signal "a" at the pre-groove area 11, having a level of approximately zero due to the servo mechanism, can indicate the amount of offset as shown in FIG. 4c. The present invention utilizes this difference $\Delta V$ derived from the average tracking error signal from the pre-format bits as an indication of the offset amount. To calculate this difference, a first sampled tracking error signal is obtained by sampling the tracking error signal Ste (of FIG. 10b) with the sample-hold circuit 61 in a first sampling period during which the light spot is scanning over the pre-format bits in area 12-1. A second sampled tracking error signal is carried out by the sample-hold circuit 71 during a second sampling period at a vacant, i.e., no data-bit, zone 11″ provided after the sequence of data bits in the previous sector's pre-groove. This zone is always vacant regardless of the existence of data bits elsewhere. After the differential amplifier 81 calculates and outputs the difference Sto′=$\Delta V$ of the first and second sampled tracking error signals, its output signal level is held constant, but is renewed by each sector, as shown in FIG. 4d and 10h. The offset generally changes slowly, for example, with each cycle of rotation of the disk. As noted above, a single rotation of the track typically has 17 sectors. Therefore, the change of the offset through a single sector having only 360°/17=21° is small enough to be negligible. This is also the reason why the tracking error signal sampled at a previous sector can be used for servo controlling the spot through the current sector. The low pass filter 82 is provided at the output terminal of the differential amplifier 81 for removing spikes and smoothing transitions produced in the offset signal Sto' for each sector. Typically low pass filter 82 has a cut-off frequency of 30 Hz. An output signal, namely an offset signal, Sto (FIG. 10i) from the low pass filter 82 may be displayed by a display device 83. Thus, the optical system as well as the tracking system of the apparatus can be adjusted by monitoring the display 83.

The output signals from the elements A and B of the light detector 3 are summed by an RF amplifier 101 to obtain pulse signals corresponding to the bits. The output of the RF amplifier 101 is delivered to a signal processing circuit 102. The signal processing circuit 102 recognizes timing and other information from the pulses of the bits of each sector, and delivers a sector mark information pulse (FIG. 10c) to the timing generator circuit 103. Signal processing circuit 102 also transmits the read-out data to the outside of the circuit. In response to the sector mark information pulse, the timing generator circuit 103 produces and delivers sampling pulses Ss1 (FIG. 10d) and Ss2 (FIG. 10e) to the sample-hold circuits 61 and 71 respectively, as described earlier. Pulse widths of the sampling pulses are typically 5 to 6 μs, however this amount can be arbitrarily chosen as long as the sampling is sufficient, because the width of the vacant zone 11' or 11" and the ID bits of the pre-format area 12-1 are 20 and 50 to 60 μs, respectively.

Figure 7:
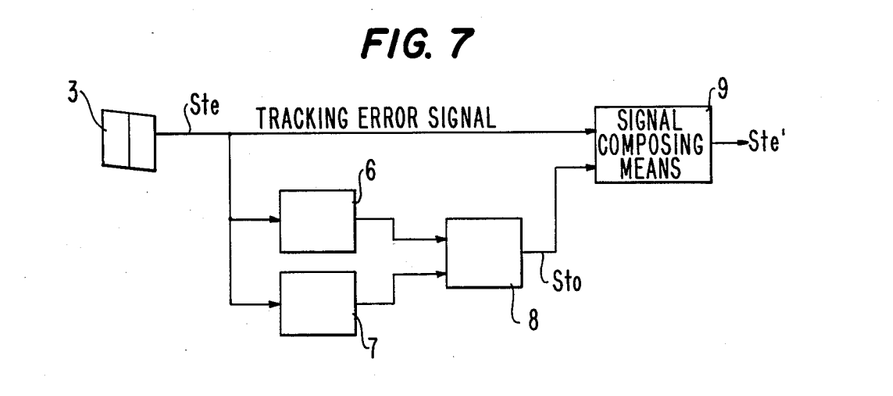
FIG. 7 is a block diagram of the present invention when the offset signal is combined with the feedback signal of the servo control.
Figure 11:
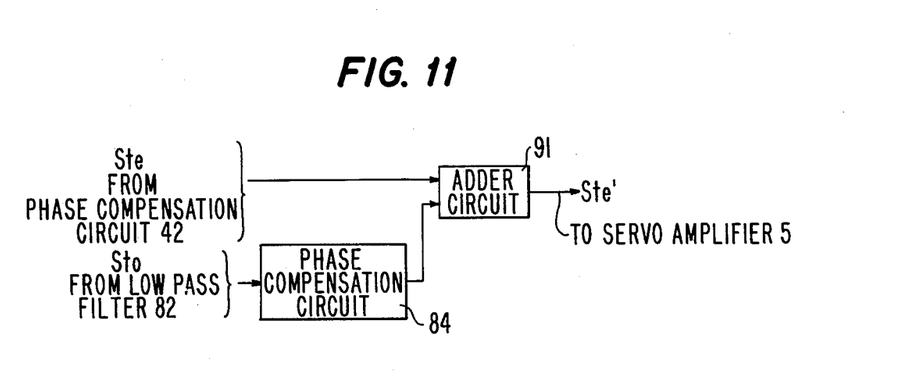
FIG. 11 is a block diagram showing a circuit to be added to the circuit of FIG. 8 in order to automatically compensate the offset.

The offset signal Sto obtained from the differential amplifier 81 by the low pass filter 82 may be combined with the tracking error signal Ste and delivered to the servo mechanism to automatically compensate for the offset. By so combining the signals, the light spot captures the center of the track, as shown in the block diagram of FIG. 7. Numeral 9 denotes a signal combining means. The circuit of the signal combining means 9 is shown in FIG. 11. Phase compensation circuit 84 has a frequency peak of a much lower frequency, for example 3 kHz, than that of the phase compensation circuit 42, thus allowing stable operation of the tracking servo mechanism. An adder circuit 91 receives the phase compensated tracking error signal Ste from the phase compensation circuit 42 and the offset signal Sto from the differential amplifier 81 through the low pass filter 82 and phase compensation circuit 84. The adder circuit 91 combines these two input signals and outputs a combined tracking error signal Ste', which is delivered to the servo amplifier 5. With this circuit, compensation takes place not only for an offset having DC components produced by, for example, a skewed disk, but also for other slowly changing offsets having AC components of, for example, approximately 30 Hz.

When the offset is on the lower side of the track, the operation is as shown in FIGS. 5a–5d, where the signal "b" is opposite in direction to that of FIGS. 4a–4d. The explanation of operation is the same as that for FIGS. 4a–4d.

Although in the above-described explanation the sampling for the second sampled tracking error signal is performed at the end of a sequence of data bits of a previous sector, it is also possible that the sampling be made before the beginning of the sequence of the data bits of the current sector.

As described earlier, the tracking error signal Ste of the present invention does not have a high frequency component, such as 5 MHz, produced by the bits. Therefore, the differential amplifier 41 may be composed of a readily available, common, inexpensive operational amplifier, having frequency characteristics up to only 20 kHz, for example. In this case, where the differential amplifier itself does not output the high frequency component, but outputs only its average of them, the low pass filter 43 may be omitted.

Although the above-described explanation is made referring to in-groove recording, it is apparent that the present invention is applicable to the on-land recording format shown in FIG. 1a, as well. Further, although the above-described explanation is made referring only to a pair of photodetector elements A and B, it is apparent that the present invention is applicable to a light detector 3 having a plurality of pairs of photo elements, such as four elements.

The many features and advantages of the invention are apparent from the detailed specification and thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An apparatus for optically reading and writing digital information on an optical recording disk having a light reflecting track divided into a plurality of sectors and having a center, an ID area and a data area along a guide groove, said apparatus comprising:

light means for focusing a light spot on the track;

light detection means for detecting light reflected from said ID and data areas of said track and having an output from which first and second light spot location signals are generated;

error means for generating a tracking error signal from the light spot location signals;

a servo control system aiming said light means, the tracking error signal being supplied to said servo control system to aim the light spot at the center of the track;

first means for determining a difference between the first and second light spot location signals generated by said light detection means from light reflected from said ID area of said track and outputting said detected difference as a first sampled tracking error signal;

second means for determining a difference between the first and second light spot location signals generated by said light detection means from light reflected from said data area of said track and outputting said difference as a second sampled tracking error signal; and third means for determining and outputting a difference between said first and second sampled tracking error signals as an offset signal indicating an amount of deviation of the light spot from the track.

2. An apparatus according to claim 1, further comprising signal combining means for combining said offset signal with said tracking error signal, and supplying the combined signals to said servo-control system to control the aiming of the light spot.

3. An apparatus according to claim 1, wherein said first means includes a low frequency filter producing an average of the first and second light spot location signals output from said light detection means.

4. An apparatus according to claim 1, wherein said first means comprises:
- first sampled tracking error signal means for receiving the first and second light spot location signals and outputting said first sampled tracking error signal as an average of said first and second light spot location signals; and
- first sample-hold means for holding and outputting said first sampled tracking error signal.

5. An apparatus according to claim 1, wherein said second means comprises:
- second sampled tracking error signal means for receiving the first and second light spot location signals and outputting said second sampled tracking error signal; and
- second sample-hold means for holding and outputting said second sampled tracking error signal.

6. An apparatus according to claim 4, further comprising first timing generator means for recognizing first and second light spot location signals derived from the ID area and delivering said first and second light spot location signals to said first sample-hold means.

7. An apparatus according to claim 5, further comprising second timing generator means for recognizing first and second light spot location signals derived from the data area and delivering said first and second light spot location signals to said second sample-hold means.

8. An apparatus according to claim 1, further comprising display means for displaying said offset signal output from said third means.

9. An apparatus for scanning an optical disk having a plurality o grooved tracks and divided into a plurality of sectors, said apparatus comprising:
- light means for focussing a light spot on the grooved tracks during first and second scanning periods;
- light detection means for receiving reflected light from said disk, and comprising first and second light detection elements situated adjacent to each other and receiving the reflected light, said first light detection element outputting a first signal representative of the amount of said reflected light received by said first light detection element and said second light detection element outputting a second signal representative of the amount of said reflected light received by said second light detection element;
- first difference means for producing a third signal representative of the difference between said first and second signals during said first scanning period;
- second difference means for producing a fourth signal representative of the difference between said first and second signals during said second scanning period; and
- third difference means for producing a fifth signal representative of the difference between said third and fourth signal, said fifth signal indicative of an amount of deviation of the light spot from the track.

* * * * *